United States Patent [19]

Winkelmann et al.

[11] 4,070,345

[45] Jan. 24, 1978

[54] MONOMETHYLOL ETHER DIOLS AND POLYURETHANE SOLUTIONS PREPARED THEREFROM

[75] Inventors: Hans Dieter Winkelmann, Cologne; Harald Oertel, Odenthal; Norbert Weimann, Leverkusen, all of Germany

[73] Assignee: Bayer Aktiengesellschaft, Leverkusen, Germany

[21] Appl. No.: 725,319

[22] Filed: Sept. 21, 1976

[30] Foreign Application Priority Data

Sept. 24, 1975 Germany .............................. 2542449

[51] Int. Cl.² .................. C07C 133/02; C08G 18/32; C08K 5/20
[52] U.S. Cl. .................... 260/77.5 AM; 260/2.5 AY; 260/32.6 NR; 260/30.4 R; 260/33.6 UB; 260/33.8 UB; 260/75 NQ; 260/77.5 SP; 260/554
[58] Field of Search ........ 260/554, 77.5 SP, 77.5 AQ, 260/75 NQ, 77.5 AM, 32.6 NR

[56] References Cited

U.S. PATENT DOCUMENTS

| | | | |
|---|---|---|---|
| 3,415,768 | 12/1968 | Dieterich et al. | 260/29.2 |
| 3,640,937 | 2/1972 | Thoma et al. | 260/77.5 SP |
| 3,658,746 | 4/1972 | Rosendahl et al. | 260/77.5 SP |
| 3,776,955 | 12/1973 | Zielinski | 260/554 |
| 3,981,913 | 9/1976 | Markiewitz | 260/77.5 AQ |

OTHER PUBLICATIONS

Houben–Weyl., Methoden der Organischen Chemie, Band X/2, Stickstoff-Verbindungen I, Teil 2, George Thieme Verlag, Stuttgart (1967), pp. 16–18.

*Primary Examiner*—H.S. Cockeram
*Attorney, Agent, or Firm*—Plumley and Tyner

[57] ABSTRACT

The invention relates to monomethylol ether diols corresponding to the formula

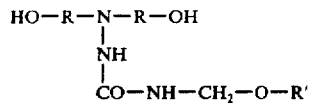

in which
R represents a straight-chain or branched alkylene radical having up to 12 carbon atoms, and
R' represents an alkyl radical.

8 Claims, No Drawings

MONOMETHYLOL ETHER DIOLS AND POLYURETHANE SOLUTIONS PREPARED THEREFROM

This invention relates to monomethylol ether diols, to a process for their production and to their use for the production of solutions of autocrosslinkable polyurethanes.

Substantially linear "segmented" polyurethane elastomers have recently acquired considerable importance. They are preferably used in the form of solutions in highly polar solvents and have acquired particular significance in the spinning of polyurethane elastomer filaments, in the coating of textiles, in the production of films and in the manufacture of microporous films or artificial leather products.

The stringent demands which materials such as these, especially elastomer filaments, have to meet can only be satisfied by suitably selecting the right starting materials and also the reaction parameters. The "segment structure" of these substantially linear polyurethanes is an important factor in this respect insofar as, for example, elasticity is essentially determined by the relatively long chain "flexible" or "soft" segments (dihydroxy compounds), whereas the softening and melting range, resistance to stressing at elevated temperatures or in hot water, modulus and strength are largely determined by the so-called "hard segments" of diisocyanate and chain extending agent (cf. Chemiker Zeitung 98 (1974), pages 344 to 353). The elastomer properties depend upon the symmetry of the "hard" or "rigid" segments and also upon optimal physical aggregation through hydrogen bridges (H-bridge crosslinks) between a plurality of individual hard segments.

This "physical crosslinking" through H-bridge bonds can easily be dissolved, for example by highly polar solvents which solvate the rigid segment (for example dimethyl formamide), in addition to which the strength of the bonds decreases relatively quickly with increasing temperature.

Accordingly, several attempts have previously been made to improve the properties of the elastomers by additional chemical crosslinking, for example by the addition of polyisocyanates, polyethylene imine derivatives, epoxides or polyformaldehyde derivatives, such as polymethylol or polymethylol ether derivatives. It has been found that, although subsequent chemical crosslinking of the polyurethanes can be obtained by adding the above compounds, accompanied by insolubilisation and possibly by an improvement in certain elastic properties, more important service properties, especially the thermal and hydrothermal properties, are adversely affected.

Particularly important service properties are, for example, the behaviour of the filaments under stress or elongation in hot water, for example under dyeing and finishing conditions. Other important service properties are the range of "flow" of the filaments under a predetermined stress at elevated temperature, for example under thermo-fixing conditions, and the behaviour of the filaments in elastic knitted fabrics under the conditions of "thermal deformation" at high elongations and at high temperatures.

This new process technology in which, for example, cups for bras of polyamide/elasthane knitted fabrics are thermally formed instead of being sewn, imposes particularly critical demands upon the thermal behaviour of elastomer filaments.

The object of the present invention is to provide new crosslinking agents for improved polyurethane elastomers and polyurethane elastomer filaments which
 a. are chemically crosslinked or are autocrosslinkable,
 b. contain the crosslinking group in a particular form which enables them to influence the thermal and hydrothermal properties much more favourably than is the case with the addition of crosslinking agents in accordance with the prior art,
 c. show improved thermal formability, and
 d. show improved resistance to hydrolysis, improved resistance to solvents, improved resistance to thermal degradation, optionally reduced surface adhesion and, optionally, improved resistance to yellowing.

The crosslinking reactions with the urethane segments, preferably urea segments, are intended to be readily thermally initiated, not to require the presence of specific groups, for example tertiary amines, and in regard to the effectiveness of crosslinking (for example insolubility of the products) to be active in even smaller quantities then is the case where external crosslinking agents are added.

Another object of the invention is to provide stable solutions of autocrosslinkable polyurethanes.

Further improvements, both desirable and achieved, are apparent from the description and the Examples.

According to the invention, these objects are achieved by monomethylol ether diols corresponding to the formula (I):

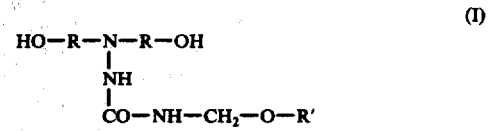

in which
 R represents a straight-chain or branched alkylene radical having up to 12 carbon atoms, and
 R' represents an alkyl radical, preferably a lower alkyl radical, having 1 to 4 carbon atoms.

Particularly, the invention relates to monomethylol ether diols corresponding to the formulae:

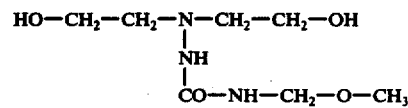

and

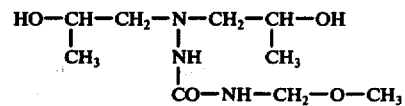

The invention also relates to a process for the production of monomethylol ether diols corresponding to the formula (I):

(I)

-continued

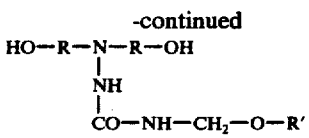

in which
R represents a straight-chain or branched alkylene radical having up to 12 carbon atoms, and
R' represents an alkyl radical, preferably a lower alkyl radical, having 1 to 4 carbon atoms, distinguished by the fact that N,N-dihydroxy alkyl hydrazines corresponding to the formula:

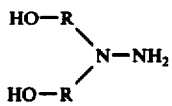

in which
R represents a straight-chain or branched alkylene radical having up to 12 carbon atoms,
are reacted wih alkoxy methyl isocyanates corresponding to the formula:

in which
R' represents an alkyl radical, preferably having 1 to 4 carbon atoms, or with their reactive derivatives, optionally in inert solvents.

Preferred components are bis-(β-hydroxyethyl) and bis-(β-hydroxypropyl)-as-hydrazine and methoxy methyl isocyanate.

The invention also relates to solutions of autocrosslinkable polyurethanes, obtained by reacting a substantially linear NCO prepolymer produced from relatively long chain dihydroxy compounds with molecular weights in the range of from about 600 to 6000, optionally in the presence of low molecular weight diols, and excess quantities of organic diisocyanates, and chain extension in polyurethane solvents, such as dimethyl formamide and dimethyl acetamide, with low molecular weight compounds such as diols, water, but preferably with N-H-active terminal groups, such as diamines, amino alcohols, dihydrazide compounds and hydrazine, with molecular weights of from 32 to about 400, distinguished by the fact that NCO prepolymers are produced using monomethylol ether diols corresponding to the formula

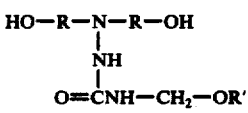

in which
R represents a straight-chain or branched alkylene radical having up to 12 carbon atoms, and
R' represents an alkyl radical, preferably having up to 4 carbon atoms, in quantities of from about 0.1 - 10% by weight and preferably in quantities of from 0.25 to 5.0% by weight, based on the solids content.

The solutions according to the invention may be processed into crosslinkable and crosslinked shaped articles.

The distinct improvement in the properties of the shaped articles produced with the crosslinking agents according to the invention may possibly be explained by the fact that, in this case, crosslinking between two linear segmented polyurethane molecule chains takes place through branching or crosslinking points in different regions of the molecule. Thus, one of the potential crosslinking points is already controllably incorporated as the monomethylol ether diol (I) in the so-called "flexible segment" in the so-called NCO-prepolymer (cf. formula scheme A), whereas the other crosslinking point arises out of the reaction of the methoxy methyl group with in most cases the "rigid urea segment". In this case, therefore, a crosslinking reaction is obtained by preferential reaction with only one rigid segment.

The reaction of the methylol ether group with urethane groups within the flexible segment, which inevitably takes place to a limited extent, is accompanied solely by a basically desirable crosslinking between flexible segments.

However, the known addition of bi- or poly-methylol ether compounds results in a chemical reaction in two or more different rigid segments. Thereafter, both the statistical distribution of the crosslinking points and also the multiple chemical substitution in several rigid segments are less favourable. This multiple chemical substitution would appear to be capable of interfering with physical "crosslinking" through hydrogen bridge bonds to such an extent that, despite an increase in the chemical crosslinking bonds, the number of physical crosslinking bonds is overproportionally reduced. This is reflected in the deterioration of a number of properties.

The controlled synthesis of the autocrosslinkable, segmented polyurea polyurethane molecules with incorporation of the monomethylol ether diols according to the invention in the "flexible segment" is also superior to the incorporation of methylol ether derivatives into the rigid segment or to an addition of polymers, for example polyurethanes, of diisocyanate and the monomethylol ether diol (I), cf. Comparison Examples.

The monomethylol ether diols of formula (I) may be incorporated in the flexible segment of the NCO prepolymers during any of the processes normally used for prepolymer production, for example using the compound (I) in the reaction of the relatively high molecular weight dihydroxy compounds:

(G = the radical of the relatively high molecular weight dihydroxy compound)
with excess quantities of diisocyanates:

(D = the radical of the diisocyanate)
to form the NCO prepolymer with the idealised structure according to formula scheme A:

Formula Scheme A a) NCO prepolymer formation with incorporation of the monomethylol ether diol of formula I

For example:

Starting materials

OCN—D—NCO + HO—G—OH + OCN—D—NCO + HO—G—OH + OCN—D—NCO
diisocyanate      relatively high molecular
                  weight diol a)

↓ $CH_2 . O . CH_3$ crosslinker diol (I)

OCN—D—NH—CO—O—G—O—CO—NH—D—NH—CO—O—| |—O—CO—NH—D—NH—CO—O—G—O—CO—NH—D—NCO
                                         |
                                         $CH_2—O—CH_3$ or, in abbreviated form T for the abbreviated form OCN—T—NCO for the modified NCO prepolymer:

—T—
 |
 $CH_2 . O . CH_3$ b) Chain extension of the NCO—prepolymer with NH—functional chain extenders: $H_2N—Y—NH_2$ (1:1)

[—T—NH—CO—NH—Y—NH—CO—NH—]$_n$  (Y = the radical of the chain extender)

—T—
 |
 $CH_2—O—CH_3$
Modified flexible    rigid segment
segment           Segmented polyurethane (urea)polymer The crosslinkable, modified NCO prepolymer behaves in virtually the same way as an unmodified NCO prepolymer. The chain extension reaction with diamines, for example, results in the formation of a typical rigid segment:

which, by interacting via hydrogen bridges with a large number of adjacent rigid segments, forms blocks of rigid segments physically crosslinked with one another and in doing so provides the typical elastic properties in the polymer.

This rigid segment is the preferred starting point for the chemical crosslinking with the methylol ether group.

It is particularly advantageous that the compounds according to the invention provide a certain additional stabilisation against discoloration on exposure to light and produce particularly favourable thermal properties and a very considerable improvement in the characteristic thermal parameter known as "hot break time".

The following monomethylol ether diols are particularly suitable for incorporation:

1,1-bis-(2'-hydroxyethyl)-4-methoxy methyl-semicarbazide 1,1-bis-(2'-hydroxyethyl)-4-ethoxy methyl-semicarbazide 1,1-bis-(2'-hydroxyethyl)-4-propoxy methyl-semicarbazide 1,1-bis-(2'-hydroxyethyl)-4-butoxy methyl-semicarbazide 1,1-bis-(2'-hydroxyethyl)-4-pentoxy methyl-semicarbazide 1,1-bis-(2'-hydroxyethyl)-4-oxtyloxy methyl-semicarbazide 1,1-bis-(2'-hydroxyethyl)-4-decyloxy methyl-semicarbazide 1,1-bis-(2'-hydroxypropyl)-4-methoxy methyl-semicarbazide 1,1-bis-(2'-hydroxybutyl)-4-methoxy methyl-semicarbazide 1,1-bis-(1'-methyl-2'-hydroxy-propyl)-4-methoxy methyl-semicarbazide 1,1-bis-(2'-methyl-2'-hydroxy-propyl)-4-methoxy methyl-semicarbazide 1,1-bis-(1',1'-dimethyl-2'-hydroxy-ethyl)-4-methoxy methyl-semicarbazide.

1-(2'-hydroxyethyl)-1-(2'-hydroxypropyl)-4-methoxy methyl semicarbazide 1-(2'-hydroxyethyl)-1-(2'-hydroxybutyl)-4-methoxy methyl semicarbazide 1,1-bis-(2'-hydroxypropyl)-4-ethoxymethyl-semicarbazide 1,1-bis-(2'-hydroxybutyl)-4-ethoxy methyl-semicarbazide The following are examples of the dihydroxy compounds having molecular weights of from about 600 to 6000, preferably from 1000 to 3000, which may be used in the synthesis of the polyurethanes: polyesters, polyethers, polylactone esters, polyacetals, polycarbonates, mixtures of these compounds or co-condensates of these compounds, for example polyester ethers, polyester lactone esters, polycarbonate esters etc. with melting points preferably below 60° C and, with particular preferance, below 50° C of the type which have repeatedly been described in regard to the synthesis of segmented polyurethane (urea) elastomers of the kind in question.

Examples are adipic acid esters of 1,6-hexane diol, 2,2-dimethyl propane diol, 1,4-butane diol, 1,2-propylene glycol and ethylene glycol or polyesters of mixtures of diols for reducing the melting point in the polyester. Polypropylene glycol ethers and, preferably, polytetramethylene glycol ether give products with a high resistance to hydrolysis. Polycaprolactone (mixed) esters and hexane diol (mixed) polycarbonates, also adipic acid copolyesters with long chain diols (for example 1,6-hexane diol), are particularly preferred because of their very high resistance to hydrolysis.

In order to improve dyeability, diols containing tertiary amines, such as N-methyl-N,N-bis-(β-hydroxyethyl)-amine or N-methyl-N,N-bis-(β-hydroxypropyl)-amine, may be present during formation of the NCO prepolymer in quantities of from about 0.03 to 0.25 mole/kg (cf. German Offenlegungsschrift No. 1,495,830).

The known diisocyanates may be used as the organic diisocyanates, although it is preferred to use diphenyl methane-4,4'-diisocyanate, the isomeric tolylene diisocyanates, diphenyl ether-4,4-diisocyanate, hexane diisocyanate, dicyclohexyl methane-4,4-diisocyanate and 3-isocyanatomethyl-3,5,5-trimethyl cyclohexane isocyanate.

The diisocyanates are reacted with the OH-containing compounds to form the NCO prepolymer in an OH/NCO molar ratio of preferably from about 1:1.35 to about 1:3.0, the NCO—prepolymer preferably containing from about 1.8 to 4.0% by weight NCO, based on the prepolymer solids.

The NCO prepolymer may be formed from the components, including the diol component (I) according to the invention, by basically known methods either in the melt or preferably in solvents.

For example, all the components may be reacted at the same time in solvents such as chlorobenzene, toluene, dioxane or, preferably, in highly polar dimethyl formamide or dimethyl acetamide at temperatures of from about 20° to about 100° C to form the prepolymer. Alternatively, it is even possible initially to form (either wholly or in part) an NCO prepolymer from the relatively long chain dihydroxy compound and only thereafter to react the monomethylol ether diol (I) to form the final NCO prepolymer with the diol incorporated. The statistical distribution form of the compound (I) within the NCO-prepolymer may be influenced according to the method adopted.

The monomethylol ether diols (I) are used in such quantities in the prepolymer forming reaction that about 0.1 to 10% by weight and preferably from 0.25 to 5.0% by weight of the diols, based on the prepolymer solids, are incorporated. Since the weight of the chain extender is only of minor importance, substantially the same quantity may be incorporated, based on the segmented poly(urea)urethane elastomer. A quantity which effectively characterises the crosslinking density is the indication in mVal/kg of —CH$_2$OR'-groups, because it shows the equivalents of crosslinker groups incorporated. In the present case, about 5 to 500 mVal and preferably about 20 to 200 mVal of crosslinker equivalents should be present in the polyurethane (cf. Examples). Naturally, excessively small quantities are unable adequately to initiate the effect, whilst excessively large quantities of crosslinking groups are also unfavourable because numerous properties (for example elongation at break, modulus — cf. Examples) are altered in this way. Accordingly, it is particularly preferred to incorporate quantities of from about 25 to 150 mVal of $CH_2O$—R'-groups per kg of polyurethane.

The prepolymer forming reaction is preferably carried out in dimethyl formamide or dimethyl acetamide as solvent at reaction temperature of from about 20° to 60° C over reaction times of from about 20 to 200 minutes.

The hydrazine derivatives (I) may be used without difficulty in the prepolymer forming reaction.

The NCO-prepolymer formed, which is modified by the incorporation of (I), is then reacted by the usual methods of chain extension known per se with substantially equivalent quantities of bifunctional N—H-active compounds in highly polar solvents such as dimethyl formamdie, dimethyl acetamide or dimethyl sulphoxide, to form highly viscous solutions of the poly(urea)urethanes. In cases where 3-isocyanatomethyl-3,5,5-trimethyl cyclohexane isocyanate is virtually exclusively used, it is also possible to use so-called "soft solvents", for example mixtures of toluene and isopropanol.

Suitable H-reactive chain extenders are glycols or water, but preferably compounds with molecular weights of from 32 to about 400 which contain the NCO-reactive hydrogen atom attached to nitrogen atoms and which correspond to the formula $N_2H$-Y-$NH_2$ in which $Y$ = a single bond (→hydrazine)

$Y$ = a difunctional aliphatic, cycloaliphatic, aromatic, araliphatic or heterocyclic radical Z (→diamines), $Y$ = the group

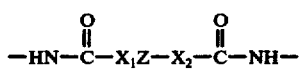

where
$Z$ = as defined above, and
$X_1$ = and $X_2$ independently of one another represent a single bond, —O— or —NH— (i.e. →dihydrazides, dicarbazinic esters, disemicarbazides, semicarbazide-hydrazide, etc), $Y$ = the group

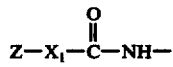

(in which Z and $X_1$ are as defined above), i.e. → aminohydrazides, aminosemicarbazides or $Y$ = NH—CO—NH— (→carbodihydrazide).

The following are examples of these chain extenders $H_2N$—Y—$NH_2$: hydrazine or hydrazine hydrate (cf. German Pat. No. 1,161,007), primary and/or aliphatic, cycloaliphatic, aromatic or heterocyclic diamines, preferably ethylene diamine, 1,3-diaminocyclohexane; 1,2-propylene diamine and/or m-xylylene diamine (cf. German Pat. No. 1,223,154; U.S. Pat. Nos. 2,929,804 and 2,929,803; DAS No. 1,494,714), dihydrazides, for example carbodihydrazide, adipic acid hydrazide (cf. German Pat. Nos. 1,123,467 and 1,157,386), aminocarboxylic acid hydrazides, such as aminoacetic acid hydrazide, β-aminopropionic acid hydrazide (cf. DAS No. 1,301,569), semicarbazide hydrazides such as for example α-semicarbazido acetic acid hydrazide or β-semicarbazidopropionic acid hydrazide (cf. German Pat. No. 1,770,591) or other known NH-compounds of the type described in the above publications and also, for example, in German Offenlegungsschrift No. 2,025,616.

Also aminoalcohols, for example amino ethanol, 4-aminocyclohexanol, are suitable chain extenders.

However, particularly preferred chain extenders are ethylene diamine, 1,2-propylene diamine, hydrazine, β-aminopropionic acid hydrazide and β-semicarbazidopropionic acid hydrazide. Relatively small quantities of so-called "co-extenders" may optionally be used for modifying the properties (for example small quantities of 1,3-diaminocyclohexane or water in addition to ethylene diamine as the main extender).

It is, of course, also possible to use relatively small quantities of monofunctional amino compounds, for example monoamines (diethyl amine), monohydrazide derivatives (acethydrazide, picolinic acid hydrazide or butyl semicarbazide), and of assymmetrical dimethyl hydrazine.

The highly viscous elastomer solutions obtained may be shaped or formed by conventional methods, for example by spread-coating onto substrates and evaporating off the solvent to form highly elastic films and sheeting, by doctor-coating onto textile substrates to form textile coatings, by coagulating solutions (optionally with non-solvents added) to form microporous films for artificial leather or, preferably and with particular importance, by spinning the solutions to form elastomer filaments.

One advantage of the autocrosslinkable polyurethane systems according to the invention is that, even in the case of wet coagulation and wet-spinning processes, there is no danger, for example, of the crosslinker being washed out with the solvent or undergoing a reduction in concentration. This is also of particular interest for artificial leather coagulation processes where a coagulation step in dimethyl formamide/water mixtures and subsequent washing processes would result in a loss of additive crosslinkers.

The high stability of the solution containing the autocrosslinkable polyurethanes to premature undesirable crosslinking, even in solution, is particularly favourable. The solutions may be kept ready for processing for weeks at a time without crosslinking. In some cases the polyurethane shaped articles may even be obtained in uncrosslinked form. For example, elastomer filaments may be spun and processed in uncrosslinked form. It is only in the specific application, for example the thermal forming of the knitted fabrics of polyamide/elasthane filaments, that the crosslinking reaction is activated at the reaction temperature and, for example, prevents degradation and breaking of the filaments in the knitted fabric.

Depending upon the shaping conditions (especially temperature), the shaped articles obtained are either uncrosslinked (at low temperatures, for example below 100° to 110° C) or partly or completely crosslinked (at high temperatures and/or with longer final heating times). The control of the crosslinking reaction will generally be adapted to the particular process and the required application.

Final heating may take place relatively slowly, for example over periods ranging from 20 to 120 minutes at about 120° to 150° C in the case of filament packages, or more quickly, for example in 1 to 5 minutes at about 130° to 180° C in the case of the coatings produced in drying tunnels, or in about 0.5 to 10 seconds in the case of high-temperature treatment zones, in the form of heating godets or heating grooves where the surface temperatures or air temperatures may amount, for example, to between 160° to 250° C. With extremely short contact times, the temperatures may even be higher (for example in the case of infrared heating zones).

There is no need for catalysts to be present during the crosslinking reaction, although catalysts may be used in cases where it is desired to accelerate the crosslinking reaction. In principle, suitable catalysts are any known accelerators for methylol(ether) and formaldehyde reactions used in the usual quantities, for example acids such as acetic acid, tartaric acid, citric acid, trichloroacetic acid, benzoic acid, ammonium chloride, ammonium chloride/ammonia mixtures, magnesium chloride, zinc chloride and other acids, acid salts or acid-acting compounds.

DESCRIPTION OF TEST METHODS AND TEST SPECIFICATIONS IN THE EXAMPLES

The parts quoted in the Examples are parts by weight, unless otherwise stated.

The molecular weight of the polyurethane elastomer is characterised by the $(\eta)_i$-value, the so-called inherent viscosity:

$$(\eta)_i = (\ln \eta \ r)/c)$$

In this equation, $\eta \ r$ is the relative viscosity of a solution of the polymer in hexamethyl phosphoramide at 20° C, and $c$ is the concentration in g/100 ml of solution. Measured values are determined on the basis of $c = 1$.

A high $\eta$ i-value, or the insolubility of the shaped articles (corresponding to $\eta \ i \rightarrow \infty$), characterises a high level of resistance to thermal degradation, as required for thermofixing and especially for thermoforming as described above.

The filaments and films are tested for their elastic properties by the methods described in Belgian Pat. Specification No. 734,194, according to which elongation at break is measured on a tensile testing machine in which the length between grips is monitored by a photocell and the particular degree of slip through the grips is compensated.

The elastic values are characterised by determining modulus at 300% (in the first elongation curve), modulus at 150% (in the third return curve) and permanent elongation (after three times 300% with elongation rates of 400% per minute, 30 seconds after relaxation).

DETERMINING ELONGATION IN HOT WATER

A piece of filament 50 mm long is stretched by means of a stretching device controlled via a force measuring head until a contraction stress of 0.25 mN/dtex is applied by the filament. This stress is maintained, if necessary by continuously increasing the degree of extension, and elongation is measured after 25 minutes under load in air (first value). The stretched filament is then immersed in water at 95° C with the load intact and the total degree of elongation is read off after another 25 minutes under load in water (second value). In the third stage, the stretched filament is removed from the water and relaxed until the stress begins to disappear, and the residual elongation is determined (third value). All the measurements are given in percent of the length between grips in accordance with the following scheme:

| 1st value | 2nd value | 3rd value |
|---|---|---|
| Elongation in air at 20° C after 25 minutes under load of 0.25 $\frac{mN}{dtex}$ [%] | Elongation in water at 95° C after 25 minutes under a load of 0.25 $\frac{mN}{dtex}$ [%] | Residual elongation after complete relaxation in air at 20° C. [%] |

The hydrothermal properties may be rated more highly, the lower the second value (elongation in hot water in relation to the first value) and the lower the third value (permanent elongation after relaxation).

DETERMINING THE REDUCTION OF STRESS IN HOT WATER (HWSR) OF ELASTOMER FILAMENTS

A piece of filament with a length between grips of 100 mm (prestressing weight 0.9 mg/dtex) is stretched by 100% at 20° C and the stress (mN/dtex) developed in the filament after 2 minutes is measured (first value). The filament kept stretched by 100% is then immersed in water at 95° C and the stress arising after a residence time of 3 minutes is determined (second value). After this measurement, the filament is again removed from the water bath and left standing at room temperature or 2 minutes. The filament which is still prestretched between the grips is then relaxed until free from stress and its residual elongation is immediately determined (third value).

| Scheme of reproduction in the Examples (abbreviation HWSR): | | |
|---|---|---|
| stress in air at 20° C mN/dtex | Stress in H₂O at 95° C mN/dtex | residual elongation after relaxation % |

The hydrothermal properties may be rated more highly, the higher the second value (stress in hot water in mN/dtex) and the lower the third value (residual elongation after the treatment in relaxed form).

DETERMINING THE HEAT DISTORTION TEMPERATURE (HDT) OF ELASTOMER FILAMENTS

The denier of elastomer filaments is determined after they have been exposed to normal climatic conditions for 3 hours in the absence of tension (weighing a piece of filament under an initial load of 0.003 mN/dtex). An elastomer filament is hung up inside a nitrogen-filled glass tube at room temperature under an initial load of 0.018 mN/dtex (length between grips 250 mm). The tube is surrounded by a heating jacket through which flows silicone oil heated by a thermostat. The temperature in the tube is initially increased to approximately 125° C over a period of about 30 minutes. Thereafter, the temperature is increased at a rate of 2.1° C per minute until the elastomer filament has undergone a change in length to more than 400 mm.

The change in temperature (abscissa) and sample elongation (ordinate) are recorded using an X-Y recorder in such an axis ratio that an increase in the measuring curve of 45° C is obtained for a relative change in length $\gamma$ of 0.8% per degree of temperature increase.

$$\frac{d\gamma}{dT} = 0.8 \ \frac{\text{percent}}{\text{degree}} \ (\gamma = \frac{\text{change in length}}{\text{length of loaded sample at room temperature}} \ \text{in \%})$$

The heat distortion temperature (HDT) is the temperature which is read off by vertically projecting the point of contact of the 45° tangent to the temperature / change in length curve on the abscissa.

The thermal stability of the elastomers may generally be rated more highly, the higher the HDT value obtained.

DETERMINING THE HOT BREAK TIME (HBT) OF ELASTOMER FILAMENTS

A piece of elastomer filament is clamped between two grips (10 cm apart), stretched by 100% and placed in stretched form on a 4 cm wide chromium-plated metal plate heated by a thermostat to a temperature of 193° C. The filament either breaks after a certain residence time or remains stable. The test is terminated if the filament is still intact after about 3 minutes (expressed as > 180 seconds). The HBT values are expressed as the time in seconds (sec) at which the stretched filaments are seen to break at a temperature of 193° C.

This measurement was developed from a simulation of the behaviour of the filaments in a knitted fabric of polyamide and elasthane filaments. It was found that basically the same results are obtained by measuring a loop of polyamide-6 filament against a loop of elasthane filament (simulation of the stitches) as when the above, simplified test is adopted.

The behaviour of elasthane filaments during thermal forming (elongations per unit area of approximately 50 to 100%; forming temperatures approximately 180° to 200° C) can be correlated fairly well according to the HBT-values.

The invention is further illustrated by but not limited to the following Examples:

EXAMPLES

I. Production Specifications

Production of the monomethylol ether diols a. Monomethylol ether semicarbazide diols General Procedure:

1 mole of N,N-bis-(hydroxyalkyl)-hydrazine (for example N,N-bis-(β-hydroxyethyl)-hydrazine) was dissolved in approximately 150 ml of chloroform, followed by the gradual dropwise addition with intensive cooling at a temperature of from −30° C to −2° C of a solution of about 1 mole of alkoxy methyl isocyanate (for example methoxy methyl isocyanate) in approximately 50 ml of chloroform.

If the substance precipitated on standing at room temperature, it was filtered under suction and optionally recrystallised.

If the substance did not crystallise out, the solvent was evaporated off in vacuo and the oily substance was directly used (cf. Table 1, compounds A and B).

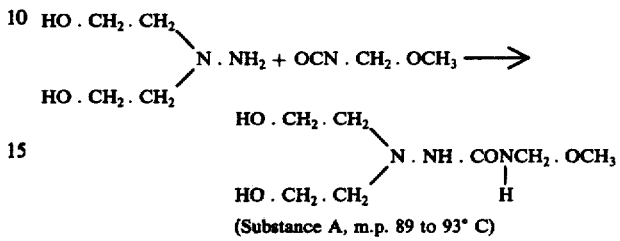

(Substance A, m.p. 89 to 93° C)

Compounds A and B have never been described in the literature.

b. Diol comparison substances

Comparison substances C and D in Table 1 were produced by basically the same reaction from N,N-bis-oxyethyl hydrazine and butyl isocyanate or phenyl isocyanate.

c. Polymeric crosslinker (E) based on diol-I/A and diphenyl methane-4,4'-diisocyanate

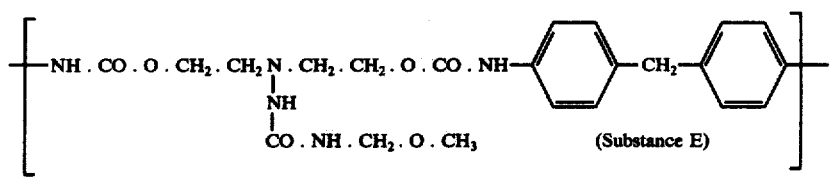

207 parts of diol I/A (cf. Table 1) were dissolved in 200 parts of dimethyl formamide, followed by the dropwise addition with stirring at 0° to 5° C of a solution of 250 parts of diphenyl methane-4,4'-diisocyanate in 257 parts of dimethylformamide. After the 50% solution had been stirred for 3 hours at approximately 30° C, it was not possible to detect any more NCO.

d. Bifunctional bis-methylol ether crosslinker (F) of 1,12-octadecane diol and methoxy methyl isocyanate:

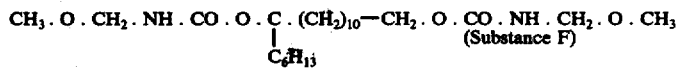

286 parts of 1,12-octadecane diol were dissolved in 2700 parts of chloroform, followed by the dropwise addition with stirring and cooling at 0° C of a solution of 174 parts of methoxy methyl isocyanate in 100 parts of chloroform. After 15 hours at room temperature, the NCO group was completely reacted. Removal of the solvent by distillation left a colourless crystallising mass which was readily soluble in dimethyl formamide.

Table 1
Production and Properties of the monomethylol ether diols (I) and comparison substances

| No. | Formula | MW | diol component | Produced from NCO + component | Molar ratio diol/NCO | ml HCCl$_3$ | Reaction tempt. °C | Aggregate form |
|---|---|---|---|---|---|---|---|---|
| A) | HOCH$_2$CH$_2$\\NNHCNHCH$_2$OCH$_3$//O=/HOCH$_2$CH$_2$ | 207 | HOCH$_2$CH$_2$\\NNH$_2$/HOCH$_2$CH$_2$ | methoxymethyl isocyanate | 1.0:1.0 | 190 | −24/−13 | F = 89/93° C |
| B) | CH$_3$CH(OH)CH$_2$\\NNHCNHCH$_2$OCH$_3$//O=/CH$_3$CH(OH)CH$_2$ | 235 | CH$_3$CH(OH)CH$_2$\\NNH$_2$/CH$_3$CH(OH)CH$_2$ | " | 1.0:1.0 | 200 | −40/−30 | lard-like crystallizes with a m.p. = 71-75° C |
| | Comparison substances | | | | | | | |
| C) | HOCH$_2$CH$_2$\\NNHCNHC$_4$H$_9$(iso)//O=/HOCH$_2$CH$_2$ | 219 | HOCH$_2$CH$_2$\\NNH$_2$/HOCH$_2$CH$_2$ | (iso)C$_4$H$_9$NCO | 1.0:1.0 | 1500 | −30/−20 | oil |
| D) | HOCH$_2$CH$_2$\\NNHCNH—C$_6$H$_5$//O=/HOCH$_2$CH$_2$ | 239 | HOCH$_2$CH$_2$\\NNH$_2$/HOCH$_2$CH$_2$ | C$_6$H$_5$·NCO | 1.0:1.0 | 1500 | −30/−20 | m.p. = 75/84° C |

In the interests of simplicity in the Examples, each diol (I) is only denoted by the letter (A to D) appearing in the Table.

II. General Procedure for producing the polyurethane elastomer solutions of Examples 1 to 11

Quantities of 1690 parts (parts by weight both here and in the following) of an adipic acid/1,6-hexane diol/2,2-dimethyl-1,13-propane diol copolyester (molar ratio of the diols 65/35) having an OH number of 66.4 were mixed at a temperature of from 30° to 40° C with the quantities indicated in column 3 of Table 2 and column 3 of Table 4. This mixture of polyester monomethylol ether diols was reacted with the quantity of diphenyl methane-4,4'-diisocyanate indicated in column 4 and a quantity of dimethy formamide such that the NCO-prepolymer contained 70 parts of solids under the reaction conditions specified in columns 5/6 to form an NCO prepolymer solution (for NCO content, based on solids content, cf. column 7 of Tables 2 and 4).

The NCO-prepolymer solution was then stirred with intensive mixing into the solution of the chain extender (ethylene diamine [reaction as carbamate according to German Pat. No. 1,223,154] or $\beta$-semicarbazido propionic acid hydrazide) in dimethyl formamide in the slight excess of the chain extender indicated. The excess of chain extender was optionally reacted with small quantities of hexane diisocyanate (cf. German Pat. No. 1,157,386) until a viscosity of at least 400 poises was reached.

III. General Procedure for producing the PU-elastomer shaped articles

The elastomer solutions were spun by a standard process. They were spun through spinnerets with 16 0.2 mm diameter bores into a vertical, heated spinning duct (wall temperature approximately 230° to 300° C additionally blown in) and run off at speeds of 100 meters per minute. After passing through a talcum bath, the filaments were wound into package form with and without 30% elongation.

In most cases, the filaments containing incorporated crosslinker diol were (partly) crosslinked and only sparingly soluble, if at all, in dimethyl formamide when they emerged from the spinning duct.

For testing purposes, the elastomer filaments were heated for 1 hour at 130° C and then tested (for results, see Tables 3 and 5).

IV. Examples 1 to 5

The Polyurethane elastomer solutions and shaped articles were produced by the methods described in II and III (cf. Table 2).

As the results of Examples 1 to 4 and 5 shows, the elastomer solutions with the incorporated crosslinker diols (I) can be produced in substantially the same way as elastomer solutions without any incorporated diols (cf. Table 2). The elastomer solutions obtained show substantially the same flow behaviour and spinning properties and are stable when stored at room temperature.

When increasing quantities of the crosslinker diol (I) are incorporated into the prepolymer, the properties of the crosslinked elastomer filaments (cf. Table 3) change in a generally typical manner. The elastic properties are altered at least in the direction of lower elongation at break and higher moduli — both after elongation to 300% and also after recovery from elongation (for example at 150%) — and in the direction of lower permanent elongation.

However, much more significance is attached to the improved hydrothermal and thermal properties, for example in "hot water elongation" the degree of elongation in water (second value) and the residual elongation after relaxation; also the stress value of the filaments in water at 95° C at 100% elongation (second HWSR value) and also the residual elongation after relaxation and the heat distortion temperature (HDT). The improvement in the hot break time (HBT) of the filaments stretched by 100% at a temperature of 193° C (corresponding to the conditions of the so-called "thermal forming" of knitted fabrics) is a particularly important factor so far as the serviceability of the filaments is concerned. In this respect, the form of crosslinking according to the invention provides for a very considerable improvement in the behaviour of the filaments under elongation at elevated temperatures. The crosslinking prevents the filaments from flowing at the high thermal forming temperatures and also prevents the filaments from breaking. In cases where these filaments crosslinked in accordance with the invention are used, correspondingly produced knitted fabrics do not show the otherwise observed breakage of filaments in the knitted fabrics.

According to the invention, the quantity of crosslinker is small and, by virtue of the more favourable statistical wide-mesh distribution of the crosslinking points from the flexible segment in accordance with the invention, it is possible to obtain effective crosslinking (insolubility) with quantities which would not be large enough in the case of added methylol ether compounds (for example E,F-Comparison Tests VB-4/VB-5). On the contrary, the addition of compounds such as these actually results in a deterioration in these properties.

Comparison Tests VB-2/VB-3 demonstrate that the improvement in the properties is not attributable to the incorporation in the polyurethane of diols with a very similar structure (C, D) because these Comparison Tests also show distinct improvements in properties.

The process according to the invention also improves the hydrolysis behaviour of the elastomer filaments (the residual strengths after intensive hydrolysis are distinctly better than in the case of uncrosslinked filaments).

TABLE 2

Reaction conditions for the preparation of poly(urea)urethane elastomer solutions: chain extender ethylene diamine

| No. (column) | diol 1 Diol (type of. Table 1) (1) | Monomethylolether (crosslinker) mVal/kg (-CH$_2$OCH$_3$) (2) | parts by weight (3) | MDI parts by weight (4) | Reaction conditions Temp. °C (5) | Reaction conditions Time mins. (6) | NCO-found (based on solids content) in % (7) | NCO:NH$_2$ ratio (8) | Viscosity in poises at c = 24% (9) |
|---|---|---|---|---|---|---|---|---|---|
| | | | | Incorporation of the crosslinker diols I according to the invention: | | | | | |
| Example No. | | | | | | | | | |
| 1 | A | 25 | 11.3 | 458.9 | 50–60 | 130 | 2.91 | 1:1.0 | 990 |

TABLE 2-continued

Reaction conditions for the preparation of poly(urea)urethane elastomer solutions: chain extender ethylene diamine

| No. (column) | Monomethylolether diol 1 Diol (type of. Table 1) (1) | (crosslinker) mVal/kg (-CH$_2$OCH$_3$) (2) | parts by weight (3) | MDI parts by weight (4) | Reaction conditions Temp. °C (5) | Time mins. (6) | NCO-found (based on solids content) in % (7) | NCO:NH$_2$ ratio (8) | Viscosity in poises at c = 24% (9) |
|---|---|---|---|---|---|---|---|---|---|
| 2 | A | 50 | 22.9 | 473.8 | 50–60 | 150 | 2.83 | 1:1.0 | 970 |
| 3 | A | 100 | 47.0 | 506.7 | 23–34 | 230 | 2.82 | 1:1.075 | 950 |
| 4 | A | 200 | 99.4 | 585.0 | 23–35 | 250 | 2.89 | 1:1.075 | 880 |
| 5 | B | 100 | 53.6 | 509.5 | 23–38 | 365 | 2.97 | 1:1.075 | 775 |
| Comparison Example without crosslinker diol I | | | | | | | | | |
| CE-1 | — | — | — | 440 | 31.53 | 430 | 2.87 | 1:1.0 | 415 |
| Comparison Examples: incorporation of structurally similar diols without any crosslinker groups | | | | | | | | | |
| CE-1 | C | molar quantity corresponding to Example 3 | 49.7 | 501.8 | 35.42 | 145 | 2.87 | 1:1.075 | 670 |
| CE-3 | D | | 54.5 | 507.0 | 35.46 | 145 | 2.80 | 1:1.075 | 690 |
| CE-4 | E | molar quantity of CH$_2$OCH$_3$ corresponding to 50 mVal/kg | Addition of polymeric crosslinker E (polyurethane of diol type I and diphenyl methane diisocyanate) c-25% (1378 parts by weight of solution V-1 plus 16.4 parts by weight of solution polyurethane-E) | | | | | | |
| CE-5 | F | | Addition of a bis-methylolurethane of 1,12-octadecane diol plus 2 moles of methoxymethyl isocyanate F c-25% (1378 parts by weight of solution V-1 plus 4.12 parts by weight of bis-methylolether urethane-F) | | | | | | |
| Example 6 | A | 50 | 22.35 | 427.0 | 50–60 | 130 | 2.27 | 1:1.0 | Viscosity at c=26% 1126 |
| Comparison Example | | | | | | | | | |
| CE-6 | — | — | — | 395.0 | 30–47 | 225 | 2.24 | 1:1.07 | 655 |

Table 3

Properties of dry-spun elastomer filaments - chain extender ethylene diamine

| Example No. | mVal/kg of -CH$_2$OCH$_3$ incorporated | Tear strength cN/dtex | Elongation at break % | Modulus at 300% mN/dtex | Modulus at 150% 3rd return from 300% mN/dtex | Permanent elongation after 3 × 300% % | HWE Elongation in air at 20° % | HWE Elongation in H$_2$O at 95° % | Residual Elongation after relaxation % |
|---|---|---|---|---|---|---|---|---|---|
| Incorporating crosslinker diols according to the invention | | | | | | | | | |
| 1 | 25 (A) | 0.56 | 536 | 1.28 | 0.20 | 20 | 48 | 107 | 24 |
| 2 | 50 (A) | 0.65 | 490 | 1.77 | 0.21 | 16 | 47 | 98 | 20 |
| 3 | 100 (A) | 0.65 | 496 | 1.83 | 0.21 | 19 | 51 | 103 | 40 |
| 4 | 200 (A) | 0.60 | 365 | 2.80 | 0.21 | 18 | 50 | 86 | 25 |
| 5 | 100 (B) | 0.64 | 490 | 1.54 | 0.20 | 20 | — | — | — |
| Comparison Example without crosslinker | | | | | | | | | |
| CE-1 | — | 0.68 | 571 | 1.29 | 0.20 | 19 | 53 | 112 | 29 |
| Comparison Examples: incorporation of structurally similar diols (C,D) without crosslinker groups | | | | | | | | | |
| CE-2 | (molar quantity corresponding to Example 300) | 0.65 | 515 | 1.54 | 0.20 | 22 | 50 | 179 | 74 |
| CE-3 | | 0.66 | 512 | 1.64 | 0.20 | 19 | 40 | 204 | 85 |
| Comparison Examples: addition of polymeric crosslinkers (E) | | | | | | | | | |
| CE-4 | molar quantity of -CH$_2$OCH$_3$ corresponding to 50 mVal/kg | 0.57 | 508 | 1.45 | 0.19 | 22 | 47 | 175 | 63 |
| Addition of bifunctional crosslinker (F) | | | | | | | | | |
| CE-5 | | 0.60 | 513 | 1.32 | 0.19 | 28 | 54 | 189 | 87 |
| Example 6 | 50 (A) | 0.72 | 482 | 1.32 | 0.20 | 10 | 84 | 166 | 39 |
| Comparison Example | | | | | | | | | |
| CE-6 | — | 0.65 | 540 | 1.12 | 0.20 | 15 | 70 | 166 | 53 |

| Stress in air at 20° C mN/dtex | HWSR Stress in water at 95° C mN/dtex | Residual elongation after relaxation % | Hydrolysis in % of original stability after 4 hours | 16 hours | 32 hours | HDT °C | Hot break time at 193° C/100% elongation in secs. | Solubility in DMF |
|---|---|---|---|---|---|---|---|---|
| 0.384 | 0.233 | 31 | 132 | 105 | 88 | 179 | 62.2 | insoluble |
| 0.401 | 0.253 | 30 | 104 | 96 | 69 | 180 | 101.3 | insoluble |
| 0.435 | 0.230 | 38 | 111 | 105 | 83 | 180 | >180 | insoluble |
| 0.440 | 0.286 | 25 | 93 | 92 | 92 | 185 | >>180 | insoluble |
| | | | 109 | 95 | 66 | 178 | 171.1 | insoluble |
| 0.370 | 0.227 | 31 | 96 | 79 | 69 | 180 | 32.6 | soluble |
| 0.431 | 0.194 | 44 | — | — | — | 174 | 16.2 | soluble |
| 0.404 | 0.150 | 49 | — | — | — | 176 | 17.9 | soluble |
| 0.411 | 0.214 | 44 | — | — | — | 177.5 | 26.5 | more than 80% soluble |

Table 3-continued

| Properties of dry-spun elastomer filaments - chain extender ethylene diamine | | | | | | | | |
|---|---|---|---|---|---|---|---|---|
| 0.404 | 0.164 | 45 | — | — | — | 174.0 | 21.7 | |
| 0.302 | 0.196 | 28 | — | — | — | 167 | 73.9 | insoluble |
| 0.320 | 0.192 | 34 | — | — | — | 167 | 6.7 | soluble |

EXAMPLE 6

This Example describes the production of a "relatively flexible" polyurethane (urea) elastomer (approximately 2.27% of NCO in the prepolymer). Production is carried out in basically the same way as described in Examples 1 to 5, cf. Tables 2 and 3.

In this case, too, the poor hot break time (HBT) value inter alia is brought to such a high level by crosslinking that filaments of the kind in question can safely be thermally formed despite the considerable reduction in "NCO hardness". In a test series in which the NCO content of the NCO prepolymer is increased, the HBT-value will be higher, the "more rigid" the NCO prepolymer or the larger the amount of rigid segment present in the filament. However, since the tendency of the solutions to become pasty increases with increasing NCO rigidity and increasing filtration difficulties arise, a "relatively flexible" NCO adjustment is entirely desirable. Even in this case, the crosslinking according to the invention provides for sufficiently high HBT-values.

The elastomer spinning solution according to Example 6 was still uncrosslinked and readily processible, even after standing for 12 weeks.

The elastomer solution could also be wet-spun in the usual way to form filaments which were crosslinked in exactly the same way as dry spun filaments after heating for 1 hour at 130° C. There was apparently no loss of crosslinking agent during coagulation (incorporation of the crosslinker group!).

EXAMPLE 7 to 9, CE-7

This Example describes the production of polyurethane elastomers by chain extension with $H_2N.NH.CO.NH.(CH_2)_2.CO.NH.NH_2$. Reaction of the prepolymer with the chain extender was carried out in substantially the same way as already described (in Examples 1 to 6), cf. also Table 4, except that the semicarbazide derivative, dissolved in twice its quantity by weight of water, was reacted with the NCO prepolymer in admixture with dimethyl formamide. In the absence of crosslinking agent, the elastomers with this composition showed poor stability under thermal forming conditions (hot break time HBT approximately 1 second). By virtue of the crosslinking reaction according to the invention, however, hydrothermal behaviour (HWE, HWSR and also the hot break time) (and HDT) was considerably improved, in addition to which the filaments were much more stable to hydrolysis.

If molecular weight is examined before and after thermal forming (30 seconds at 180° C), the $\eta$ i-value (10 g/l in hexamethyl phosphoramide at 25° C) falls from 1.0 in the Comparison Text to approximately 0.70, whilst the crosslinked filaments remain insoluble in the solvent (very high molecular weight remains intact).

Table 4

| | Production of segmented polyurethane (urea)solutions: chain extender β-semicarbazido propionic acid hydrazide | | | | | | | | |
|---|---|---|---|---|---|---|---|---|---|
| | Monomethylol ether diol (1) (crosslinker) | | | MDI | | | NCO— | | |
| Number | diol (type cf. Table 1) | mVal/kg (-CH$_2$OCH$_3$) | Parts by weight | Parts by weight | Reaction Conditions | | observed (based on solids) in % | NCO—NH$_2$ ratio | Viscosity in poises at c=26% |
| | | | | | Temp ° C | Time (mins) | | | |
| Example No. | | | | | | | | | |
| 7 | A | 100 | 47.0 | 506.7 | approx 34 | 230 | 2.82 | 1:1.075 | 425 |
| 8 | A | 200 | 99.4 | 585.0 | approx 35 | 250 | 2.89 | 1:1.075 | 600 |
| 9 | B | 100 | 53.6 | 509.5 | approx 38 | 365 | 2.97 | 1:1.075 | 520 |
| Comparison Example without crosslinker diol | | | | | | | | | |
| CE-7 | — | — | — | 400 | 31-53 | 430 | 2.87 | 1:1.0 | 475 |

Table 5

| Properties of dry-spun elastomer filaments : chain extender β-semicarbazido propionic acid hydrazide | | | | | | | HWE | | |
|---|---|---|---|---|---|---|---|---|---|
| Example No. | mVal/kg of —CH$_2$OCH$_3$ incorporated | Tear strength cN/dtex | Elongation at break % | Modulus at 300% mN/dtex | Modulus at 150% 3rd return from 300% mN/dtex | Permanent elongation after 3 × 300% % | Elongation in air at 20° % | Elongation in H$_2$O at 95° % | Residual elongation after relaxation % |
| 7 | 100 (A) | 0.69 | 530 | 1.86 | 0.21 | 17 | 51 | 212 | 84 |
| 8 | 200 (A) | 0.62 | 431 | 2.70 | 0.19 | 18 | 35 | 106 | 26 |
| 9 | 100 (B) | 0.60 | 490 | 2.07 | 0.21 | 18 | 38 | 192 | 83 |
| Comparison Example | | | | | | | | | |
| CE-7 | — | 0.40 | 452 | 1.67 | 0.16 | 18 | 69 | >400 | cannot be measured |

| HWSR | | | | | | | Hot break time at 193° C/100% elongation in secs. | Solubility in DMF |
|---|---|---|---|---|---|---|---|---|
| Stress in air at 20° C mN/dtex | Stress in water at 95° C mN/dtex | Residual elongation after relaxation % | Hydrolysis resistance, in % of original strength after | | | ° C | | |
| | | | 4 hours | 16 hours | 32 hours | | | |
| 0.408 | 0.159 | 47 | 103 | 88 | 54 | 179 | 13.5 | insoluble |
| 0.488 | 0.209 | 42 | 114 | 95 | 79 | 183.5 | 90.0 | " |
| 0.440 | 0.185 | 57 | — | — | — | 176 | 27.8 | " |
| 0.301 | 0.117 | 57 | 64 | 49 | 33 | 175.5 | 1.0 | soluble |

EXAMPLE 10

The quantities of diphenyl methane-4,4'-diisocyanate (MDI) indicated in Table 6, in the form of 80% solutions in dimethyl formamide, were reacted under the reaction conditions specified to form the NCO-prepolymers in 1045 parts by weight of a dihydroxy polytetramethylene ether (OH No. 108) and 22.74 parts by weight of N-methyl-bis-(β-hydroxypropyl)-amine, both in the presence and in the absence of the cross-linker diol I/B. The NCO prepolymer in the form of a 20% solution in dimethyl formamide was then chain-extended with 1,2-propylene diamine (in the presence of $CO_2$) in a molar ratio of NCO to $NH_2$ of 1:1.0 (cf. Table 6).

The clear, viscous solutions were applied to a polyamide-6 film in a layer thickness of about 0.6 mm, dried in a drying cabinet at 70°/100° C and then aftertreated in a heating duct for 3 minutes at 140° C.

Thereafter, the coating according to Example 12 was insoluble in dimethyl formamide, showed increased adhesion to the substrate, increased softening temperatures (Δ = 10° C) and discoloured less than in the comparison test CE-10 after 8, 15 and 22 hours in a Fadeometer. The film of the comparison test was still soluble in dimethyl formamide.

form an 80% solution), and heated under the reaction conditions specified to form the NCO-prepolymer. The NCO content of the prepolymer was determined immediately before the chain-extending reaction. Chain extension was carried out with ethylene or 1,2-propylene diamine in dimethyl formamide in the form of the diamine carbamates (with the addition of carbon dioxide to the amine solution in twice the quantity by weight of the diamine). The quantity of dimethyl formamide was adjusted in such a way that 20% elastomer solutions were formed. When the NCO prepolymer was introduced with stirring into the carbamate solution, a homogeneous elastomer solution was formed from the carbamate with liberation of carbon dioxide.

The solutions were dry spun into filaments in the same way as described above. The elastomer filaments containing crosslinker diol were already completely or partly insoluble in dimethyl formamide on leaving the spinning duct. Before testing, the elastomer filaments were fully heated (for 1 hour in a drying cabinet at 130° C) or thermally aftertreated on heating godets at approximately 180° to 200° C with residence times of about 0.5 to 12 seconds. Thereafter, the crosslinker-containing solutions were completely insoluble in dimethyl formamide at room temperature.

In addition, the crosslinked filaments showed im-

Table 6

Production of polyurethane (urea) elastomer solutions based on polyethers: chain extender 1,2-propylene diamine

| Example No. | Crosslinker diol I/B mVal/kg | Crosslinker diol I/B Parts by Weight | MDI Parts by weight | Reaction conditions of NCO prepolymer formation °C | Reaction conditions of NCO prepolymer formation mins | % NCO (based on solids) in NCO—PP | Solution viscosity in poises c = 26% | Solubility of the coating |
|---|---|---|---|---|---|---|---|---|
| 10 | 100 | 36.41 | 415 | 25.40 | 280 | 2.08 | 100 | insoluble |
| Comparison Example CE-10 | — | — | 376 | 23.43 | 70 | 2.10 | 106 | soluble |

EXAMPLES 11 - 12

Quantities of 1925 parts of an adipic acid-ethylene glycol/1,4-butane diol(1:1) mixed polyester (OH No. 58.1) were mixed with the quantities indicated in Table 7 of "colour diol" (N-methyl-bis-(β-hydroxy propyl)-amine) and crosslinker diols (1), diphenyl methane-4,4'-diisocyanate and dimethyl formamide (in quantities to proved hydrothermal properties, improved hydrolysis stability and considerably improved hot break times in relation to the comparison tests (cf. Table 8). Basically, ethylene diamine gave better results than 1,2-propylene diamine when the thermal and hydrothermal values were compared starting from identical prepolymers. In both cases, however, the values were distinctly improved by crosslinking.

Table 7

Production of polyurethane (urea)elastomer soluctions based on polyesters: chain extension with ethylene diamine or 1,2-propylene diamine

| Example No. | Crosslinked diol Type | Crosslinked diol Quantity mVal/kg | Crosslinked diol Parts by weight | Colour diol parts by weight | MDI Parts by weight | Reaction conditions Temp °C | Reaction conditions Time mins | NCO in the PP (based on solids) % | Chain Extender | Viscosity in poises c = 20% |
|---|---|---|---|---|---|---|---|---|---|---|
| 11 | A | 100 | 56.09 | 39.8 | 598 | 25–39 | 150 | 2.52 | ethylene diamine | 512 |
| Comparison Example CE-11 | — | — | — | 37.9 | 524 | 38–54 | 150 | 2.60 | " | 495 |
| 12 | A | 100 | 56.36 | 40.3 | 598 | 25–39 | 150 | 2.52 | 1,2-propylene diamine | 465 |
| Comparison Example CE-12 | — | — | — | 38.1 | 525 | 38–54 | 150 | 2.60 | " | 250 |

Table 8

Properties of dry spun elastomer filaments

| Example No. | mVal/kg of —CH$_2$OCH$_3$ incorporated | Tear strength cN/dtex | Elongation at break % | Modulus at 300% mN/deex | Modulus at 150% 3rd return from 300% mN/dtex | Permanent elongation after 3 × 300% % | HWE Elongation in air at 20° % | HWE Elongation in H$_2$O at 95° % | HWE Residual elongation after relaxation % |
|---|---|---|---|---|---|---|---|---|---|
| 11 | 100 | 0.58 | 562 | 1.24 | 0.19 | 16 | 62 | 186 | 58 |

Table 8-continued

| Properties of dry spun elastomer filaments | | | | | | | | |
|---|---|---|---|---|---|---|---|---|
| Comparison Example CE-11 | | 0.54 | 614 | 1.09 | 0.19 | 17 | 64 | 282 | 102 |
| 12 | 100 | 0.57 | 526 | 0.73 | 0.18 | 12 | 129 | 325 | 97 |
| Comparison Example CE-12 | | 0.55 | 612 | 0.85 | 0.20 | 16 | 94, solution | >400% | |

| HWSR | | | Hydrolysis-resistance, in % of original strength after | | | | Hot break time at 193° C/100% elongation in secs. | Solubility in DMF |
|---|---|---|---|---|---|---|---|---|
| Stress in air at 20° C mN/dtex | Stress water at 95° C mN/detex | Residual elongation after relaxation % | 4 hours | 16 hours | 32 hours | HDT ° C | | |
| 0.325 | 0.167 | 44 | — | | | 175.5 | >180 | insoluble |
| 0.300 | 0.151 | 46 | — | | | 175.5 | 24.1 | soluble |
| 0.201 | 0.147 | 35 | 102 | 42 | — | 171.5 | >180 | insoluble |
| | | | 89 | 29 | — | 168 | 14.8 | soluble |

EXAMPLE 13

Quantities of 1200 parts of a 1,6-hexane diol polycarbonate (molecular weight 1925), 25.7 parts of N-methyl-bis-N,N-(β-hydroxypropyl)-amine and 408 parts of toluene were heated for about 10 hours at 60° C with the following:

| 20.7 parts of diol 1/A and | 428.0 parts | (cf. Example 13) |
|---|---|---|
| without diol 1/A | 405.8 parts of 3-isocyanatomethyl-3,5,5-trimethyl cyclohexane isocyanate | (cf. Comparison Example CE-13) | until the NCO content of the NCO prepolymer became substantially constant.

1,4-Diaminocyclohexane (36% cis/64% trans) was dissolved in the quantities indicated in proportions of a 1:1 mixture of toluene and isopropanol and the resulting solutions were reacted while stirring with the quantities of NCO prepolymers indicated, resulting in the formation of solutions with a viscosity of approximately 1000 poises/approx. 25%.

When a finish on sheets of artificial leather or PU-coated fabrics was produced in the usual way with 0.1% by weight of tartaric acid added as catalyst to the PU solution, and the finished product was allowed to travel through a drying tunnel for approximately 2 minutes at 130° to 150° C, the finish according to Example 13 was insoluble in the solvent mixture used for production and was also resistant to highly concentrated alcohol, whereas the comparison finish of CE-13 was readily soluble or heavily swelling and was only moderately resistant. Corresponding films according to Example 13 or finishes were highly stable to light and showed favourable resistance to rubbing and bending.

Table 9

| | % NCO | Parts of 1,4-diamino-cyclohexane | Parts of tol/isoprop. | Parts of NCO-prepolymer solution | Viscosity | Stability of the solution |
|---|---|---|---|---|---|---|
| Example 13 | 5.10 | 9.10 | 370 | 155.0 | approx. 1000 | stable |
| Comparison Example CE-13 | 5.28 | 9.25 | 370 | 155.5 | approx. 1000 | stable |

We claim:

1. Monomethyl ether diols corresponding to the formula:

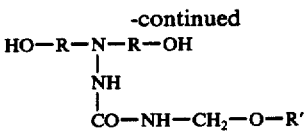

(I)

in which

R represents a straight-chain or branched alkylene radical having up to 12 carbon atoms, and R' represents an alkyl radical.

2. Monomethyl ether diols corresponding to the formula:

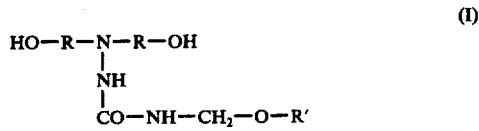

(I)

in which

R represents a straight-chain or branched alkylene radical having up to 12 carbon atoms, and R' represents a lower alkyl radical having 1 to 4 carbon atoms.

3. A monomethyl ether diol corresponding to the formula:

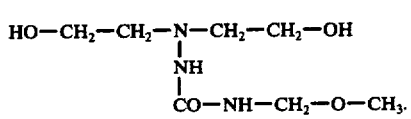

4. A monomethyl ether diol corresponding to the formula:

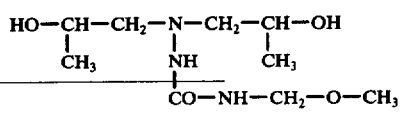

5. A process for the production of monomethyl ether diols corresponding to the formula:

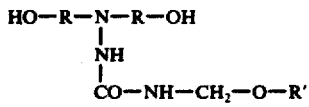

in which
- R represents a straight-chain or branched alkylene radical having up to 12 carbon atoms, and
- R' represents an alkyl radical, wherein N,N-dihydroxy alkyl hydrazines corresponding to the formula:

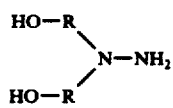

in which
- R represents a straight-chain or branched alkylene radical having up to 12 carbon atoms, are reacted with alkoxymethyl isocyanates corresponding to the formula:

in which R' represents an alkyl radical, or with reactive derivatives thereof, optionally in inert solvents.

6. The process of claim 5 for the production of monomethyl ether diols corresponding to the formula:

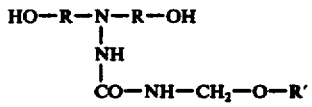

R represents a straight-chain or branched alkylene radical having up to 12 carbon atoms, and
R' represents a lower alkyl radical having 1 to 4 carbon atoms, wherein
N,N-dihydroxy alkyl hydrazines corresponding to the formula:

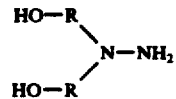

in which
- R represents a straight-chain or branched alkylene radical having up to 12 carbon atoms, are reacted with alkoxymethyl isocyanates corresponding to the formula:

in which R' represents an alkyl radical having 1 to 4 carbon atoms.

7. Solutions of autocrosslinkable polyurethane produced by reacting a substantially linear NCO prepolymer of relatively long chain dihydroxy compounds with molecular weights of from about 600 to 6000 and excess quantities of organic diisocyanates, and chain extension in polyurethane solvents, with water or low molecular weight compounds comprising diols, diamines aminoalcohols, dihydrazide compounds, and hydrazine said compounds having molecular weights of from 32 to about 400, wherein the NCO prepolymer is produced using monomethylol ether diols corresponding to the formula:

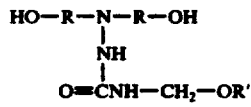

in which
- R is a straight-chain or branched alkylene radical having up to 12 carbon atoms; and
- R' is an alkyl radical, in quantities of from about 0.1 to 10% by weight based on the solids content.

8. The solution of claim 7 in which the quantities of 0.25 to 5% by weight are used rather than 0.1 to 10% as specified in claim 7.

* * * * *